(12) United States Patent
Kao (10) Patent No.: US 10,951,257 B2
(45) Date of Patent: Mar. 16, 2021

(54) SIGNAL TRANSCEIVER DEVICE AND CALIBRATION METHOD THEREOF

(71) Applicant: Realtek Semiconductor Corporation, Hsinchu (TW)

(72) Inventor: Tzu-Ming Kao, Hualien County (TW)

(73) Assignee: Realtek Semiconductor Corporation, Hsinchu (TW)

( * ) Notice: Subject to any disclaimer, the term of this patent is extended or adjusted under 35 U.S.C. 154(b) by 264 days.

(21) Appl. No.: 15/867,675

(22) Filed: Jan. 10, 2018

(65) Prior Publication Data

US 2019/0052303 A1 Feb. 14, 2019

(30) Foreign Application Priority Data

Aug. 11, 2017 (TW) .................................. 106127367

(51) Int. Cl.
*H04B 1/44* (2006.01)
*H04B 17/14* (2015.01)
*H04B 1/525* (2015.01)
*H04B 17/21* (2015.01)

(52) U.S. Cl.
CPC .............. *H04B 1/44* (2013.01); *H04B 1/525* (2013.01); *H04B 17/14* (2015.01); *H04B 17/21* (2015.01)

(58) Field of Classification Search
USPC .................................................... 455/78, 82
See application file for complete search history.

(56) References Cited

U.S. PATENT DOCUMENTS

| | | | | |
|---|---|---|---|---|
| 7,392,015 | B1 * | 6/2008 | Farlow | H04B 17/21 342/387 |
| 7,715,836 | B2 * | 5/2010 | Vassiliou | H04B 17/20 455/115.1 |
| 7,856,050 | B1 * | 12/2010 | Wiss | H04B 17/0085 375/224 |
| 8,379,767 | B2 * | 2/2013 | Zhu | H04L 27/368 375/322 |
| 8,837,563 | B2 * | 9/2014 | Salhov | H04B 7/005 375/220 |

(Continued)

FOREIGN PATENT DOCUMENTS

TW 201545514 A 12/2015

OTHER PUBLICATIONS

Shahram Abdollahi-Alibeil et al., "A 65nm Dual-Band 3-Stream 802.11n MIMO WLAN SoC"., 2011 IEEE International Solid-State Circuits Conference., p. 170-172.

*Primary Examiner* — Hai V Nguyen
(74) *Attorney, Agent, or Firm* — CKC & Partners Co., LLC (57) ABSTRACT

A signal transceiver device includes a transceiver circuit, a switching circuit, a compensation circuit, and a calibration circuit. The transceiver circuit includes a transmitter and a receiver. The switching circuit has a first configuration and a second configuration, in which the transmitter is coupled to the receiver via the switching circuit. The compensation circuit analyzes an output of the receiver to obtain a first (Continued)

analyzed result and a second analyzed result, and generates first compensation coefficients and second compensation coefficients, in which the first analyzed result is corresponding to the first configuration, and the second analyzed result is corresponding to the second configuration. The calibration circuit calibrates the transmitter according to the first compensation coefficients, and calibrates the receiver according to the second compensation coefficients.

20 Claims, 5 Drawing Sheets

(56) References Cited

U.S. PATENT DOCUMENTS

| | | | | |
|---|---|---|---|---|
| 9,008,161 B1* | 4/2015 | Chang | ............... | H04L 25/03261 375/219 |
| 10,283,848 B2* | 5/2019 | Rheinfelder | ............. | H04B 1/62 |
| 10,700,419 B2* | 6/2020 | Rheinfelder | ........... | H01Q 1/246 |
| 2004/0198340 A1* | 10/2004 | Lee | ........................ | H04B 17/21 455/423 |
| 2006/0044185 A1* | 3/2006 | Jin | ........................ | H01Q 3/267 342/368 |
| 2007/0218850 A1* | 9/2007 | Pan | ....................... | H03D 7/1441 455/189.1 |
| 2009/0131006 A1* | 5/2009 | Wu | ....................... | H03D 7/1441 455/257 |
| 2009/0140821 A1* | 6/2009 | Kwon | .................... | H03C 3/406 332/103 |
| 2009/0270053 A1* | 10/2009 | Bury | ....................... | H04L 27/364 455/102 |
| 2009/0310711 A1* | 12/2009 | Chiu | ...................... | H04L 27/364 375/302 |
| 2011/0069767 A1* | 3/2011 | Zhu | ...................... | H04L 27/3863 375/259 |
| 2013/0208774 A1* | 8/2013 | Salhov | ................... | H04B 17/14 375/220 |
| 2014/0341263 A1* | 11/2014 | Wu | .................... | H04B 17/0085 375/224 |
| 2015/0349900 A1* | 12/2015 | Cheng | .................... | H04B 17/21 455/302 |
| 2015/0350000 A1* | 12/2015 | Chang | .................... | H04L 27/364 375/227 |
| 2016/0329631 A1* | 11/2016 | Rheinfelder | .......... | H04L 43/106 |
| 2017/0163356 A1* | 6/2017 | Chen | ........................ | H04B 1/16 |
| 2017/0373770 A1* | 12/2017 | Lin | ........................ | H04B 17/21 |
| 2018/0083661 A1* | 3/2018 | Emadi | .................. | H04C 1/1036 |
| 2018/0366815 A1* | 12/2018 | Rheinfelder | ............. | H01Q 3/34 |
| 2021/0013592 A1* | 1/2021 | Rheinfelder | .......... | H04L 43/106 |

* cited by examiner

SIGNAL TRANSCEIVER DEVICE AND CALIBRATION METHOD THEREOF

RELATED APPLICATIONS

This application claims priority to Taiwan Application Serial Number, 106127367, filed Aug. 11, 2017, which is herein incorporated by reference.

BACKGROUND

Technical Field

The present disclosure relates to a signal transceiver device, and, particularly, to a mechanism and a method for calibrating mismatches of channels between a transmitter and a receiver.

Description of Related Art

Circuits for communication are widely employed in electronic devices. In order to transmit or receive data correctly, mismatches between channels in a transceiver are calibrated. In current approaches, the calibration mechanism for channel mismatches of the receiver is generally independent of the calibration mechanism for channel mismatches of the transmitter. In other words, in the current approaches, at least two individual and independent calibration circuits, which calibrate the transmitter and the receiver respectively, are arranged in a single transceiver circuit.

DETAILED DESCRIPTION

Figure 1:
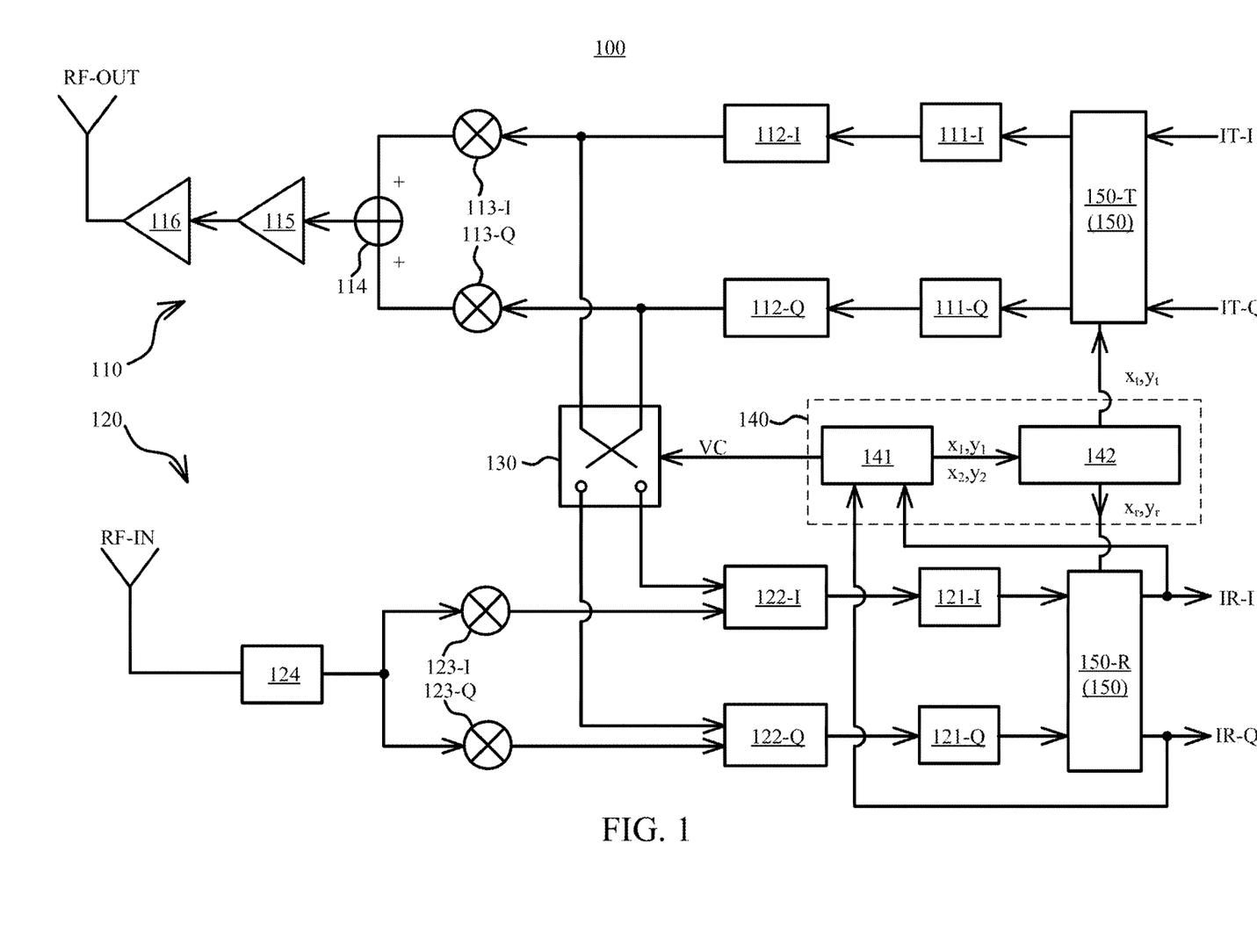
FIG. 1 is a schematic diagram of a signal transceiver device, according to some embodiments of the present disclosure.

Reference is made to FIG. 1. FIG. 1 is a schematic diagram of a signal transceiver device 100, according to some embodiments of the present disclosure. The signal transceiver device 100 includes a transceiver circuit which includes a transmitter 110 and a receiver 120, a switching circuit 130, a compensation circuit 140, and a calibration circuit 150. In some embodiments, the signal transceiver device 100 may transmit a signal RF-OUT having radio frequency, and/or to receive a signal RF-IN having radio frequency.

In some embodiments, the transmitter 110 includes digital-to-analog converters (DACs) 111-I and 111-Q, baseband circuits 112-I and 112-Q, mixers 113-I and 113-Q, an adder 114, a driver 115, and a power amplifier 116. The DACs 111-I and 111-Q generate corresponding analog signals (not shown) to the baseband circuits 112-I and 112-Q based on the input signals IT-I and IT-Q, respectively, in order to perform subsequent mixing and transmitting operations. In some embodiments, the baseband circuits 112-I and 112-Q may be implemented with a filter circuit.

In some embodiments, the receiver 120 includes analog-to-digital converters (ADCs) 121-I and 121-Q, baseband circuits 122-I and 122-Q, mixers 123-I and 123-Q, and a low noise amplifier 124. The ADCs 121-I and 121-Q generate output signals IR-I and IR-Q, respectively, according to signals processed by the low noise amplifier 124, the mixers 123-I and 123-Q, and the baseband circuits 122-I and 122-Q. In some embodiments, the baseband circuit 122-I and 122-Q may be implemented with a filter circuit.

In some embodiments, the DAC 111-I and the baseband circuit 112-I effectively form an in-phase signal baseband path of the transmitter 110 (path TX-I), and the DAC 111-Q and the baseband circuit 112-Q effectively form a quadrature signal baseband path of the transmitter 110 (path TX-Q). In some embodiments, the ADC 121-I and the baseband circuit 122-I effectively form an in-phase signal baseband path of the receiver 120 (path RX-I), and the ADC 121-Q and the baseband circuit 122-Q effectively form a quadrature signal baseband path of the receiver 120 (path RX-Q). Ideally, a signal on the in-phase signal baseband path and a signal on the quadrature signal baseband path are different in phase by 90 degrees.

In some embodiments, the switching circuit 130 may be implemented with switches. The switching circuit 130 selectively employs a first configuration or a second configuration according to a control signal VC, in order to couple the transmitter 110 to the receiver 120. For example, if the first configuration is employed, the switching circuit 130 is configured to couple an output of the baseband circuit 112-I to an input of the baseband circuit 122-I, and to couple an output of the baseband circuit 112-Q to an input of the baseband circuit 122-Q. Alternatively, if the second configuration is employed, the switching circuit 130 is configured to couple the output of the baseband circuit 112-I to the input of the baseband circuit 122-Q, and to couple the output of the baseband circuit 112-Q to the input of the baseband circuit 122-I.

In other words, if the switching circuit 130 is operated in the first configuration, the path TX-I is coupled to the path RX-I, and the path TX-Q is coupled to the path RX-Q. Alternatively, if the switching circuit 130 is operated in the second configuration, the path TX-I is coupled to the path RX-Q, and the path TX-Q is coupled to the path RX-I.

In some embodiments, the compensation circuit 140 generates compensation coefficients $x_t$ and $y_t$ and compensation coefficients $x_r$ and $y_r$ according to a first analyzed result and a second analyzed result, respectively.

For illustration, the compensation circuit 140 includes a reference coefficient generation circuit 141 and a processing circuit 142. In the first configuration (i.e., the path TX-I coupled to the path RX-I, and the path TX-Q coupled to the path RX-Q, shown in FIG. 3A), the reference coefficient generation circuit 141 performs spectrum analysis (e.g., Fourier Transform) on the output signals IR-I and IR-Q, in order to determine reference coefficients $x_1$ and $y_1$ associated with the first analyzed result. Alternatively, in the second configuration (i.e., the path TX-I coupled to the path RX-Q, and the path TX-Q coupled to the path RX-I, shown in FIG. 3B), the reference coefficient generation circuit 141 performs spectrum analysis on the output signals IR-I and IR-Q, in order to determine reference coefficients $x_2$ and $y_2$ associated with the second analyzed result. As a result, the processing circuit 142 is able to determine compensation coefficients $x_t$ and $y_t$ according to the reference coefficients $x_1$ and $y_1$, and to determine the compensation coefficients $x_r$ and $y_r$ according to the reference coefficients $x_2$ and $y_2$. In addition, the reference coefficient generation circuit 141 is further configured to output the control signal VC after the reference coefficients $x_1$ and $y_1$ or the reference coefficients $x_2$ and $y_2$ are determined, in order to switch the configuration of the switching circuit 130.

In some embodiments, implementations of the reference coefficient generation circuit 141 can be understood with reference to a spectrum analyzing circuit and a calibration coefficient calculating unit described in a related application (US patent application NO. U.S. Ser. No. 14/724,781). As such, the reference coefficient generation circuit 141 is able to generate the reference coefficients $x_1$ and $y_1$ and the reference coefficients $x_2$ and $y_2$, and thus the repetitious descriptions are not further given herein. The above descriptions are given for illustrative purposes, and various circuits and/or algorithms able to calibrate mismatches between the in-phase path and the quadrature path are within the contemplated scope of the present disclosure.

The calibration circuit 150 includes calculation circuits 150-T and 150-R. The calculation circuit 150-T is coupled to the processing circuit 142, in order to receive the compensation coefficients $x_t$ and $y_t$. The calculation circuit 150-T is coupled to the paths TX-I and TX-Q, and calibrates the mismatches between the paths TX-I and TX-Q of the transmitter 110 according to the compensation coefficients $x_t$ and $y_t$. The calculation circuit 150-R is coupled to the processing circuit 142, in order to receive the compensation coefficients $x_r$ and $y_r$. The calculation circuit 150-R is coupled to the paths RX-I and RX-Q, and calibrates the mismatches between the paths RX-I and RX-Q of the receiver 120 according to the compensation coefficients $x_r$ and $y_r$. The related descriptions are given with reference to FIGS. 2-3B in the following paragraphs.

Figure 2:
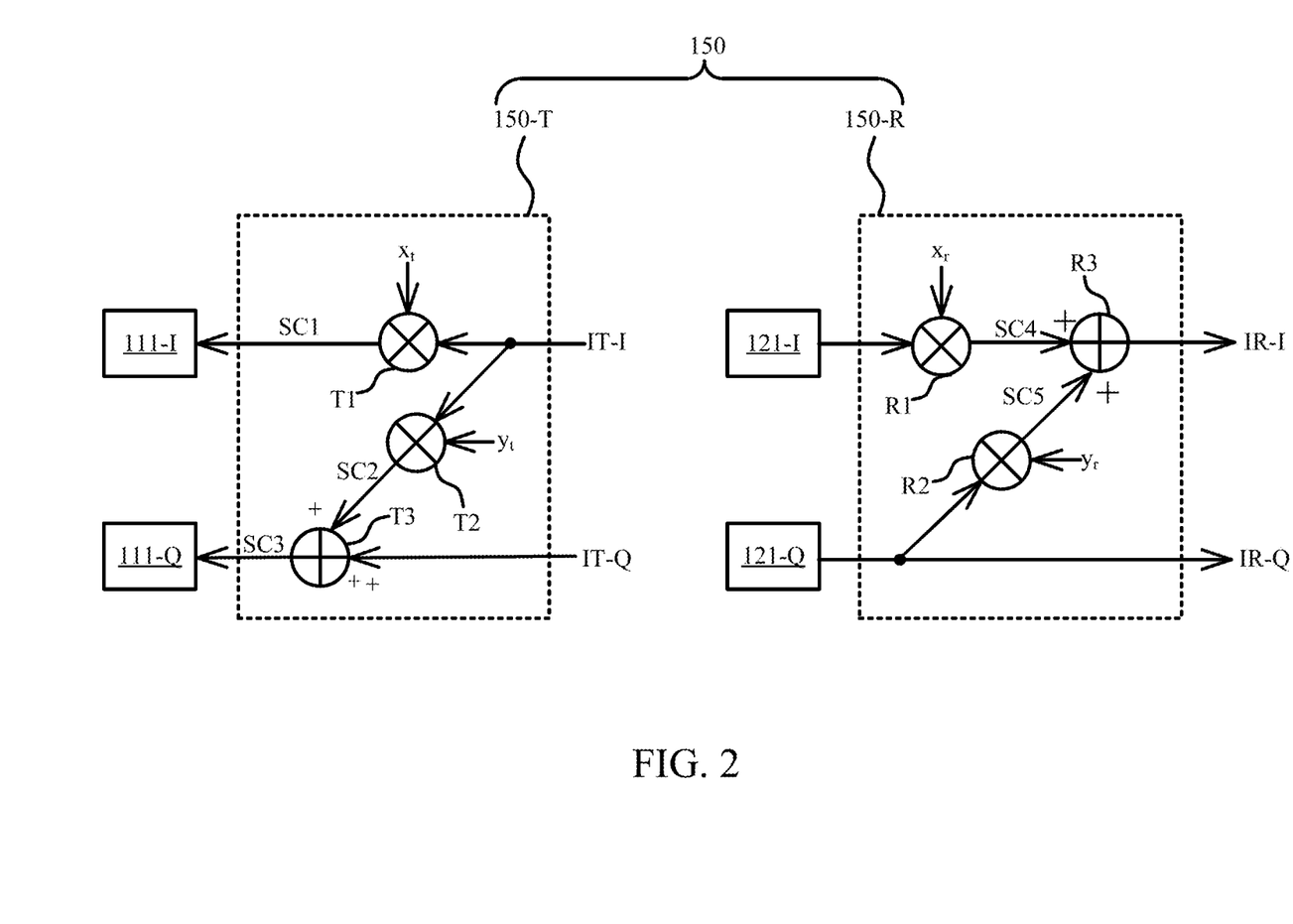
FIG. 2 is a schematic diagram of the calibration circuit in FIG. 1, according to some embodiments of the present disclosure.

Reference is made to FIG. 2. FIG. 2 is a schematic diagram of the calibration circuit 150 in FIG. 1, according to some embodiments of the present disclosure. As shown in FIG. 2, the calculation circuit 150-T includes multipliers T1-T2 and an adder T3. The multiplier T1 generates a calibration signal SC1 to the DAC 111-I according to the compensation coefficient $x_t$ and the input signal IT-I for subsequent operations. The multiplier T2 generates a calibration signal SC2 according to the compensation coefficient $y_t$ and the input signal IT-I. The adder T3 is configured to generate a calibration signal SC3 according to the input signal IT-Q and the calibration signal SC2, and to output the calibration signal SC3 to the DAC 111-Q in FIG. 1 for subsequent operations. Effectively, after the processing of the calculation circuit 150-T, the mismatches between the paths TX-I and TX-Q are compensated.

Furthermore, the calculation circuit 150-R includes multipliers R1 and R2 and an adder R3. The multiplier R1 is coupled to the ADC 121-I and configured to generate a calibration signal SC4 according to the compensation coefficient $x_r$ and an output of the ADC 121-I. The multiplier R2 is coupled to the ADC 121-Q, and configured to generate a calibration signal SC5 according to the compensation coefficient $y_r$ and an output of the ADC 121-Q. The adder R3 generates the output IR-I according to the calibration signals SC4 and SC5. Moreover, the output of the ADC 121-Q is directly outputted as the output signal IR-Q. Effectively, after the processing of the calculation circuit 150-R, the mismatches between the paths RX-I and RX-Q are compensated.

The following paragraphs will describe embodiments of the processing circuit 142 in FIG. 1, but the present disclosure is not limited thereto. In some approaches, if gain mismatch and phase mismatch (e.g., gain/phase mismatch between paths TX-I and TX-Q, or gain/phase mismatch between paths RX-I and RX-Q) are known, the compensation coefficient X (e.g., $x_t$ or $x_r$ in FIG. 2) may be derived as X=1/((1+G)*cos(P)), and the compensation coefficient Y (e.g., $y_t$ or $y_r$ in FIG. 2) may be derived as Y=tan(P), in which G indicates the gain mismatch, and P indicates the phase mismatch. For example, if the input signals IT-I and IT-Q are (1+G)cos(ωt+P) and sin(ωt), the corresponding compensation coefficients $x_t$ and $y_t$ are 1/((1+G)*cos(P)) and tan(P) respectively. It is noted that, as the mismatches discussed in the present application are present on the baseband paths, and the mismatches discussed in U.S. Ser. No. 14/724,781 are present in the mixers. Therefore, Y=tan(P) of the present application and Y discussed in U.S. Ser. No. 14/724,781 are different by a minus sign. Despite these coefficients are different by a minus sign, the reference coefficient generation circuit 141 can be implemented with the calibration coefficient unit and the spectrum analysis circuit since the calibration coefficient unit and the spectrum analysis circuit, in some embodiments of U.S. Ser. No. 14/724,781, determine the coefficients X—Y based on the output of the spectrum analysis circuit.

Thus, with respect to FIG. 2, the compensation coefficients $x_t$, $y_t$, $x_r$, and $y_r$ may be derived as equations (1)-(4), in which $G_t$ indicates the gain mismatch between the paths TX-I and TX-Q, and $P_t$ is the phase mismatch between the paths TX-I and TX-Q. $G_r$ indicates the gain mismatch between the paths RX-I and RX-Q, and $P_r$ is the phase mismatch between the paths RX-I and RX-Q.

$$x_t = \frac{1}{(1+G_t)\cos(P_t)} \quad (1)$$

$$y_t = \tan(P_t) \quad (2)$$

$$x_r = \frac{1}{(1+G_r)\cos(P_r)} \quad (3)$$

$$y_r = \tan(P_r) \quad (4)$$

Figure 3A:
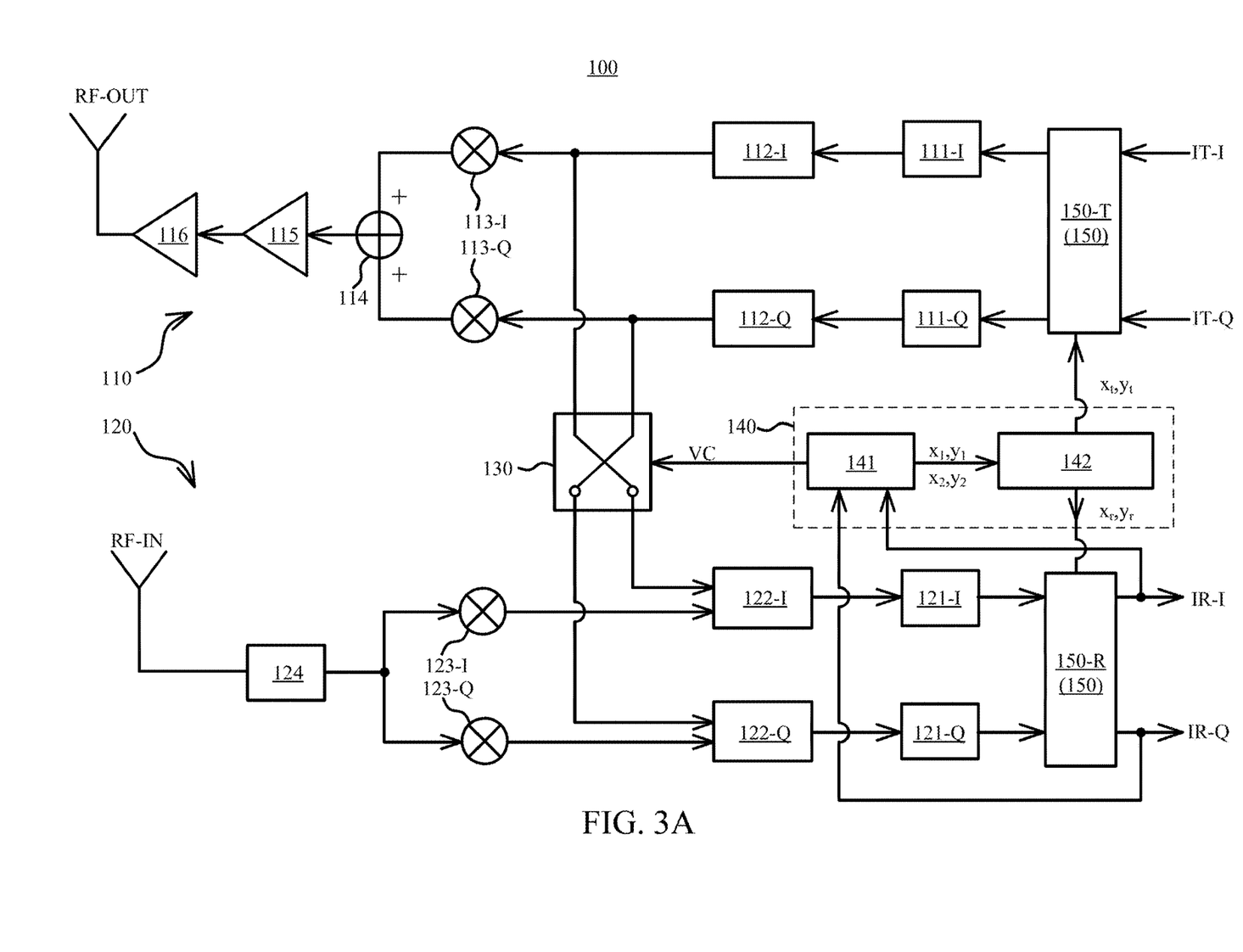
FIG. 3A is a schematic diagram of the signal transceiver device in FIG. 1 operating in the first configuration, according to some embodiments of the present disclosure.

Reference is made to FIG. 3A. FIG. 3A is a schematic diagram of the signal transceiver device 100 in FIG. 1 operating in the first configuration, according to some embodiments of the present disclosure. As shown in FIG. 3A, the path TX-I is coupled to the path RX-I via the switching circuit 130, and the path TX-Q is coupled to the path RX-Q via the switching circuit 130. Under this condition, the coefficients $x_1$ and $y_1$ generated by the reference coefficient generation circuit 141 may be derived as the following equations (5) and (6)

$$\begin{cases} x_1 = \frac{1}{(1+G_t)(1+G_r)\cos(P_t+P_r)} & (5) \\ y_1 = \tan(P_t+P_r) & (6) \end{cases}$$

Figure 3B:
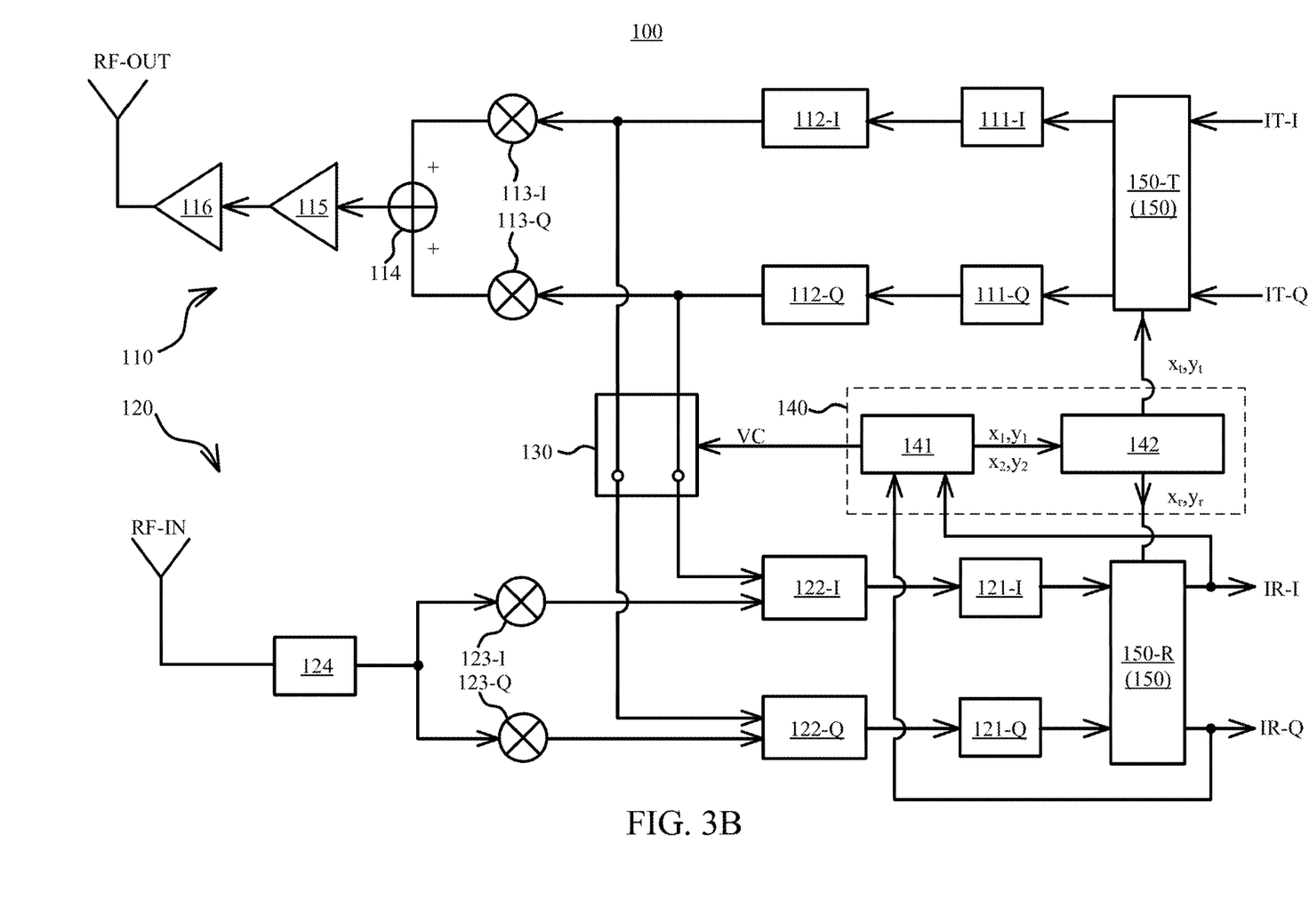
FIG. 3B is a schematic diagram of the signal transceiver device in FIG. 1 operating in the second configuration, according to some embodiments of the present disclosure.

Reference is made to FIG. 3B. FIG. 3B is a schematic diagram of the signal transceiver device 100 in FIG. 1 operating in the second configuration, according to some embodiments of the present disclosure. In FIG. 3B, the path TX-I is coupled to the path RX-Q via the switching circuit 130, and the path TX-Q is coupled to the path RX-I via the switching circuit 130. Under this condition, the coefficients $x_2$ and $y_2$ generated by the reference coefficient generation circuit 141 may be derived as the following equations (7) and (8):

$$\begin{cases} x_2 = \dfrac{1}{\dfrac{(1+G_t)}{(1+G_r)}\cos(P_t - P_r)} & (7) \\ y_2 = \tan(P_t - P_r) & (8) \end{cases}$$

With the equations (2), (4), (6), and (8), the compensation coefficients $y_t$ and $y_r$ may be derived as the following equations (9) and (10) if the phase mismatches (i.e., $P_t$ and $P_r$) are small.

$$\begin{cases} y_1 = \tan(P_t + P_r) \cong \tan(P_t) + \tan(P_r) = y_t + y_r \\ y_2 = \tan(P_t - P_r) \cong \tan(P_t) - \tan(P_r) = y_t - y_r \end{cases} \Rightarrow \begin{cases} y_t = \dfrac{y_1 + y_2}{2} & (9) \\ y_r = \dfrac{y_1 - y_2}{2} & (10) \end{cases}$$

With the equations (1), (3), (5), (7) and transformation of variables, the compensation coefficients $x_t$ and $x_r$ may be derived as the following equations (11) and (12) when the gain mismatches are small.

$$\begin{cases} x_t = \dfrac{2x_1 x_2 \left[\left(1 - \dfrac{y_t^2}{4}\right) \times \left(1 - \dfrac{y_r^2}{4}\right) - y_t \times y_r\right] \times \left[\left(1 - \dfrac{y_t^2}{4}\right) \times \left(1 - \dfrac{y_r^2}{4}\right) + y_t \times y_r\right]}{y_t \left\{ x_1\left[\left(1 - \dfrac{y_t^2}{4}\right) \times \left(1 - \dfrac{y_r^2}{4}\right) - y_t \times y_r\right] + x_2\left[\left(1 - \dfrac{y_t^2}{4}\right) \times \left(1 - \dfrac{y_r^2}{4}\right) + y_t \times y_r\right] \right\}} & (11) \\[2em] x_r = \dfrac{2x_1 x_2 \left[\left(1 - \dfrac{y_t^2}{4}\right) \times \left(1 - \dfrac{y_r^2}{4}\right) - y_t \times y_r\right] \times \left[\left(1 - \dfrac{y_t^2}{4}\right) \times \left(1 - \dfrac{y_r^2}{4}\right) + y_t \times y_r\right]}{y_r \left\{ x_1\left[\left(1 - \dfrac{y_t^2}{4}\right) \times \left(1 - \dfrac{y_r^2}{4}\right) - y_t \times y_r\right] - x_2\left[\left(1 - \dfrac{y_t^2}{4}\right) \times \left(1 - \dfrac{y_r^2}{4}\right) + y_t \times y_r\right] \right\}} & (12) \end{cases}$$

In the equations (9)-(12), the reference coefficients $x_1$, $x_2$, $y_1$, and $y_2$ are able to be generated by the reference coefficient generation circuit 141 in FIG. 1. Accordingly, the processing circuit 142 can be designed according to the equations (9)-(12). For example, in some embodiments, the processing circuit 142 may be implemented with a processor, a digital circuit, and/or an application-specific integrated circuit performing the equations (9)-(12), in order to generate the compensation coefficients $x_t$, $y_t$, $x_r$, and $y_r$. Alternatively, in some other embodiments, the processing circuit 142 may be implemented with an algorithm or software performing the equations (9)-(12). Various implementations of the processing circuit 142 are within the contemplated scope of the present disclosure.

Figure 4:
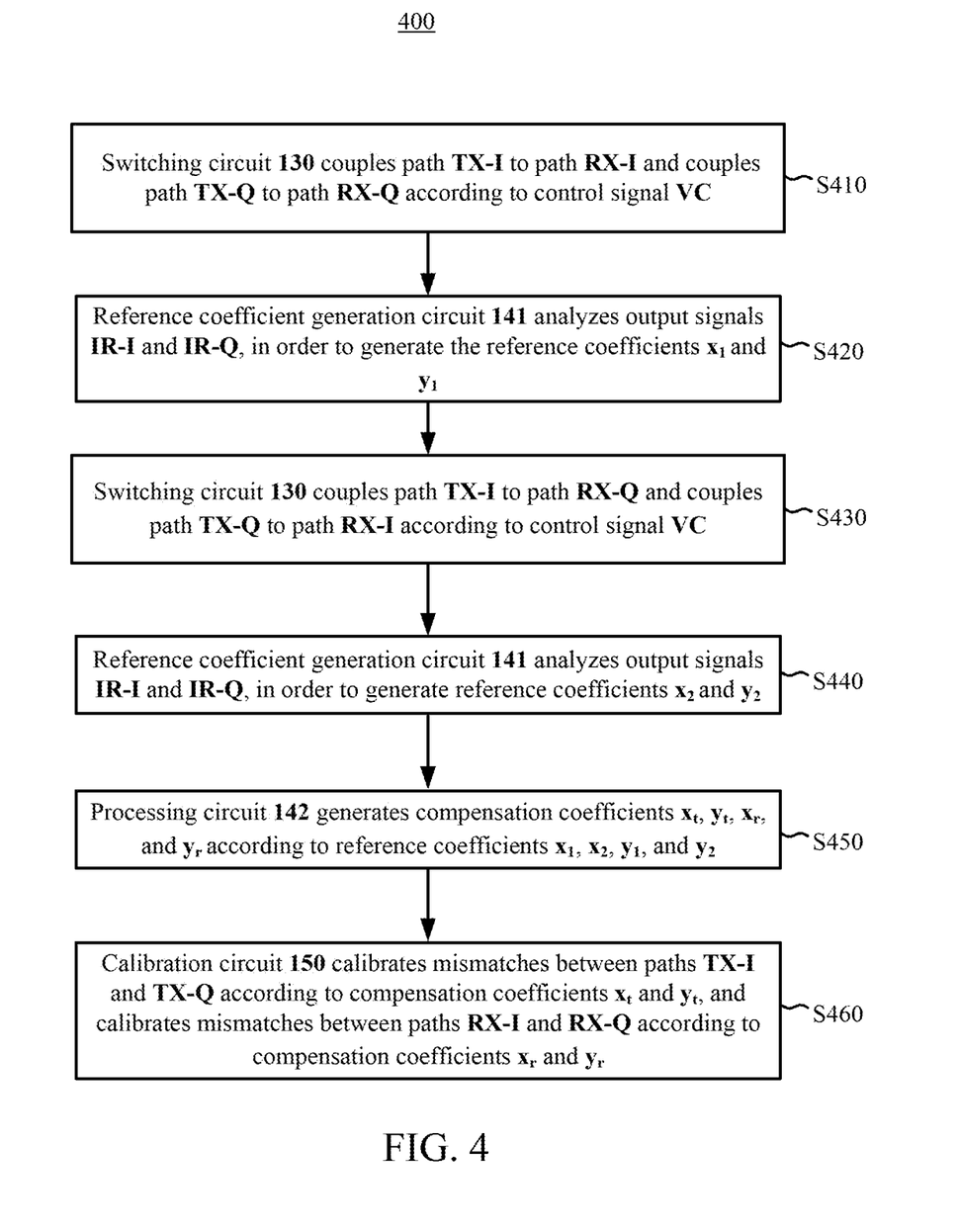
FIG. 4 is a flow chart of a calibration method according to some embodiments of the present disclosure.

Reference is made to FIG. 4. FIG. 4 is a flow chart of a calibration method 400 according to some embodiments of the present disclosure. For ease of understanding, reference is further made to FIG. 1, in order to illustrate operations of the signal transceiver device 100. In some embodiments, the calibration method 400 includes operations S410-S460.

In operation S410, the switching circuit 130 couples the path TX-I to the path RX-I and couples the path TX-Q to the path RX-Q according to the control signal VC. In operation S420, the reference coefficient generation circuit 141 analyzes the output signals IR-I and IR-Q, in order to generate the reference coefficients $x_1$ and $y_1$.

For illustration, as shown in FIG. 3A, the output of the baseband circuit 112-I is coupled to the input of the baseband circuit 122-I via the switching circuit 130, and the output of the baseband circuit 112-Q is coupled to the input of the baseband circuit 122-Q via the switching circuit 130. Under this condition, the reference coefficient generation circuit 141 is able to generate the reference coefficients $x_1$ and $y_1$.

In operation S430, the switching circuit 130 couples the path TX-I to the path RX-Q and couples the path TX-Q to the path RX-I according to the control signal VC. In operation S440, the reference coefficient generation circuit 141 analyzes the output signals IR-I and IR-Q, in order to generate the reference coefficients $x_2$ and $y_2$.

For illustration, as shown in FIG. 3B, the output of the baseband circuit 112-I is coupled to the input of the baseband circuit 122-Q via the switching circuit 130, and the output of the baseband circuit 112-Q is coupled to the input of the baseband circuit 122-I via the switching circuit 130. Under this condition, the reference coefficient generation circuit 141 generates the reference coefficients $x_2$ and $y_2$.

In operation S450, the processing circuit 142 generates the compensation coefficients $x_t$, $y_t$, $x_r$, and $y_r$ according to the reference coefficients $x_1$, $x_2$, $y_1$, and $y_2$. For example, the processing circuit 142 may obtain the compensation coefficients $x_t$, $y_t$, $x_r$, and $y_r$ by using the equations (9)-(12).

In operation S460, the calibration circuit 150 calibrates the mismatches between the paths TX-I and TX-Q according to the compensation coefficients $x_t$ and $y_t$, and calibrates the mismatches between the paths RX-I and RX-Q according to the compensation coefficients $x_r$ and $y_r$.

For example, as shown in FIG. 2, the calculation circuit 150-T processes the input signals IT-I and IT-Q according to the compensation coefficients $x_t$ and $y_t$, in order to calibrate the mismatches between the paths TX-I and TX-Q. The calculation circuit 150-R processes the outputs of the ADC 121-I and ADC 121-Q according to the compensation coefficients $x_r$ and $y_r$, in order to calibrate the mismatches between the paths RX-I and RX-Q.

In some embodiments, before the calibration method 400 is performed, the compensation coefficients $x_r$ and $x_t$ are set to 1, and the compensation coefficients $y_r$ and $y_t$ are set to 0, in order to ensure that the signal transceiver device 100 can operate correctly. The above values are given for illustrative purposes, and the present disclosure is not limited thereto.

In some embodiments, during performing the calibration method 400, the input signals IT-I and IT-Q of the transmitter 110 are set to be test signals having a specific frequency. In some embodiments, after the calibration method 400 is performed, the switching circuit 130 is disabled to disconnect the transmitter 110 from the receiver 120. The above arrangement is given for illustrative purposes, and the present disclosure is not limited thereto.

The above description of the calibration method 400 includes exemplary operations, but the operations of the calibration method 400 are not necessarily performed in the order described above. The order of the operations of the calibration method 400 can be changed, or the operations can be executed simultaneously or partially simultaneously as appropriate, in accordance with the spirit and scope of various embodiments of the present disclosure.

In some related approaches, mismatches between signal transmitting paths of a transmitter and mismatches between signal transmitting paths of a receiver are individually calibrated. In other words, in these approaches, a calibration mechanism and a calibration mechanism for the receiver are independent from each other. Compared with these approaches, in the signal transceiver device 100, the baseband circuits of the transmitter 110 and the receiver 120 may share the calibration mechanism and generate the compensation coefficients $x_t$ and $y_t$ for calibrating the transmitter 110 and the compensation coefficients $x_r$ and $y_r$ for calibrating the receiver 120.

As described above, the signal transceiver device and the calibration method are able to share the calibration mechanism to calibrate mismatches in the transmitter and the receiver.

What is claimed is:

1. A signal transceiver device, comprising:
   a transceiver circuit comprising a transmitter and a receiver;
   a switching circuit having a first configuration and a second configuration, wherein the transmitter is coupled to the receiver via switching circuit, wherein the second configuration is that a first quadrature signal baseband path of the receiver is coupled to a first in-phase signal baseband path of the transmitter via the switching circuit, wherein the first configuration is that a second quadrature signal baseband path of the transmitter is coupled to the first quadrature signal baseband path of the receiver via the switching circuit;
   a compensation circuit configured to analyze an output of the receiver to obtain a first analyzed result and a second analyzed result, and to generate a plurality of first compensation coefficients and a plurality of second compensation coefficients, wherein the first analyzed result is corresponding to the first configuration, the second analyzed result is corresponding to the second configuration, and each of the first analyzed result and the second analyzed result is associated with the transmitter and the receiver; and
   a calibration circuit configured to calibrate the transmitter according to the plurality of first compensation coefficients, and to calibrate the receiver according to the plurality of second compensation coefficients.

2. The signal transceiver device of claim 1, wherein the compensation circuit is configured to obtain the plurality of first compensation coefficients if the switching circuit operates in the first configuration and the compensation circuit is configured to obtain the plurality of second compensation coefficients if the switching circuit operates in the second configuration.

3. The signal transceiver device of claim 1, wherein the receiver further comprises a second in-phase signal baseband path, and the second in-phase signal baseband path is coupled to the first in-phase signal baseband path via the switching circuit in the first configuration.

4. The signal transceiver device of claim 3, wherein the second quadrature signal baseband path is coupled to the second in-phase signal baseband path via the switching circuit in the second configuration.

5. The signal transceiver device of claim 4, wherein the second in-phase signal baseband path and the first quadrature signal baseband path correspond to at least one first baseband circuit of the receiver, and the first in-phase signal baseband path and the second quadrature signal baseband path correspond to at least one second baseband circuit of the transmitter.

6. The signal transceiver device of claim 1, wherein the compensation circuit comprises:
   a reference coefficient generation circuit configured to perform a spectrum analysis on the output of the receiver if the switching circuit operates in the first configuration, in order to generate a first reference coefficient and a second reference coefficient that are associated with the first analyzed result, wherein the reference coefficient generation circuit is configured to perform the spectrum analysis on the output of the receiver if the switching circuit operates in the second configuration, in order to generate a third reference coefficient and a fourth reference coefficient that are associated with the second analyzed result; and
   a processing circuit configured to determine the plurality of first compensation coefficients according to the first reference coefficient and the second reference coefficient, and to determine the plurality of second compensation coefficients according to the third reference coefficient and the fourth reference coefficient.

7. The signal transceiver device of claim 1, wherein the calibration circuit comprises:
   a first calculation circuit coupled to the transmitter, and configured to adjust a plurality of first signals received by the transmitter; and
   a second calculation circuit coupled to the receiver, and configured to adjust a plurality of second signals to be outputted by the receiver.

8. The signal transceiver device of claim 7, wherein the first calculation circuit comprises:
   a first multiplier configured to generate a first calibration signal according to one of the plurality of first compensation coefficients and one of the plurality of first signals, and to output the first calibration signal to a first digital-to-analog converter of the transmitter;
   a second multiplier configured to generate a second calibration signal according to another one of the plurality of first compensation coefficients and the one of the plurality of first signals; and
   an adder configured to generate a third calibration signal according to the second calibration signal and another one of the plurality of first signals, and to output the third calibration signal to a second digital-to-analog converter of the transmitter.

9. The signal transceiver device of claim 7 wherein the second calculation circuit comprises:
   a first multiplier configured to generate a first calibration signal according to one of the plurality of second compensation coefficients and one of the plurality of second signals;
   a second multiplier configured to generate a second calibration signal according to another one of the plurality of second compensation coefficients and another one of the plurality of second signals; and
   an adder configured to generate an output signal according to the first calibration signal and the second calibration signal.

10. A signal transceiver device, comprising:
   a transceiver circuit comprising a transmitter and a receiver, the transmitter comprising a first in-phase signal baseband path and a first quadrature signal baseband path, and the receiver comprising a second in-phase signal baseband path and a second quadrature signal baseband path;

a compensation circuit configured to generate a plurality of first compensation coefficients and a plurality of second compensation coefficients according to a first analyzed result and a second analyzed result that are associated with an output of the receiver, wherein each of the first analyzed result and the second analyzed result is associated with the transmitter and the receiver, the compensation circuit configured to obtain the first analyzed result if the first in-phase signal baseband path is coupled to the second in-phase signal baseband path, and the first quadrature signal baseband path is coupled to the second quadrature signal baseband path, and the compensation circuit to obtain the second analyzed result if the first in-phase signal baseband path is coupled to the second quadrature signal baseband path, and if the first quadrature signal baseband path is coupled to the second in-phase signal baseband path; and a calibration circuit configured to calibrate a mismatch between the first in-phase signal baseband path and the first quadrature signal baseband path, and to calibrate a mismatch between the second in-phase signal baseband path and the second quadrature signal baseband path.

11. The signal transceiver device of claim 10, wherein the first in-phase signal baseband path and the first quadrature signal baseband path correspond to at least one baseband circuit of the transmitter, and the second in-phase signal baseband path and the second quadrature signal baseband path correspond to at least one baseband circuit of the receiver.

12. The signal transceiver device of claim 10, further comprising:

a switching circuit controlled by the compensation circuit, in order to couple the first in-phase signal baseband path to the second in-phase signal baseband path or to the second quadrature signal baseband path.

13. The signal transceiver device of claim 10, wherein the receiver is configured to output a first output signal and a second output signal via the second in-phase signal baseband path and the second quadrature signal baseband path, respectively, and the compensation circuit comprises:

a reference coefficient generation circuit configured to perform a spectrum analysis on the first output signal and the second output signal if the first in-phase signal baseband path is coupled to the second in-phase signal baseband path, and if the first quadrature signal baseband path is coupled to the second quadrature signal baseband path, in order to generate a first reference coefficient and a second reference coefficient that are associated with the first analyzed result, and the reference coefficient generation circuit configured to perform the spectrum analysis on the first output signal and the second output signal if the first in-phase signal baseband path is coupled to the second quadrature signal baseband path, and if the first quadrature signal baseband path is coupled to the second in-phase signal baseband path, in order to generate a third reference coefficient and a fourth reference coefficient that are associated with the second analyzed result; and a processing circuit configured to determine the plurality of first compensation coefficients according to the first reference coefficient and the second reference coefficient, and to determine the plurality of second compensation coefficients according to the third reference coefficient and the fourth reference coefficient.

14. The signal transceiver device of claim 10, wherein the calibration circuit comprises:

a first calculation circuit coupled between the first in-phase signal baseband path and the first quadrature signal baseband path, and configured to adjust a plurality of first signals received by the first in-phase signal baseband path and the first quadrature signal baseband path, respectively; and a second calculation circuit coupled between the second in-phase signal baseband path and the second quadrature signal baseband path, and configured to adjust a plurality of second signals outputted by the second in-phase signal baseband path and the second quadrature signal baseband path, respectively.

15. The signal transceiver device of claim 14, wherein the first calculation circuit comprises:

a first multiplier configured to generate a first calibration signal according to one of the plurality of first compensation coefficients and one of the plurality of first signals, and to output the first calibration signal to the first in-phase signal baseband path;

a second multiplier configured to generate a second calibration signal according to another one of the plurality of first compensation coefficients and the one of the plurality of first signals; and an adder configured to generate a third calibration signal according to the second calibration signal and another one of the plurality of first signals, and to output the third calibration signal to the first quadrature signal baseband path.

16. The signal transceiver device of claim 14, wherein the second calculation circuit comprises:

a first multiplier configured to generate a first calibration signal according to one of the plurality of second compensation coefficients and one of the plurality of second signals;

a second multiplier configured to generate a second calibration signal according to another one of the plurality of second compensation coefficients and another one of the plurality of second signals; and an adder configured to generate an output signal according to the first calibration signal and the second calibration signal.

17. A calibration method, comprising:

coupling, by a switching circuit, a transmitter to a receiver, wherein the switching circuit having a first configuration and a second configuration, wherein the second configuration is that a first quadrature signal baseband path of the receiver is coupled to a first in-phase signal baseband path of the transmitter via the switching circuit, wherein the first configuration is that a second quadrature signal baseband path of the transmitter is coupled to the first quadrature signal baseband path of the receiver via the switching circuit;

analyzing an output of the receiver to obtain a first analyzed result and a second analyzed result, wherein the first analyzed result corresponds to the first configuration, and the second analyzed result corresponds to the second configuration; and generating a plurality of first compensation coefficients and a plurality of second compensation coefficients according to the first analyzed result and the second analyzed result, in order to calibrate the transmitter and the receiver, respectively, wherein each of the first analyzed result and the second analyzed result is associated with the transmitter and the receiver.

18. The calibration method of claim 17, wherein analyzing the output of the receiver comprising:

analyzing the output of the receiver to obtain the first analyzed result if the switching circuit operates in the first configuration; and analyzing the output of the receiver to obtain the second analyzed result if the switching circuit operates in the second configuration.

19. The calibration method of claim 17, wherein the receiver further comprises a second in-phase signal baseband path, and the second in-phase signal baseband path is coupled to the first in-phase signal baseband path via the switching circuit in the first configuration.

20. The calibration method of claim 19, wherein the second quadrature signal baseband path is coupled to the second in-phase signal baseband path via the switching circuit in the second configuration.

\* \* \* \* \*